Figure 2:
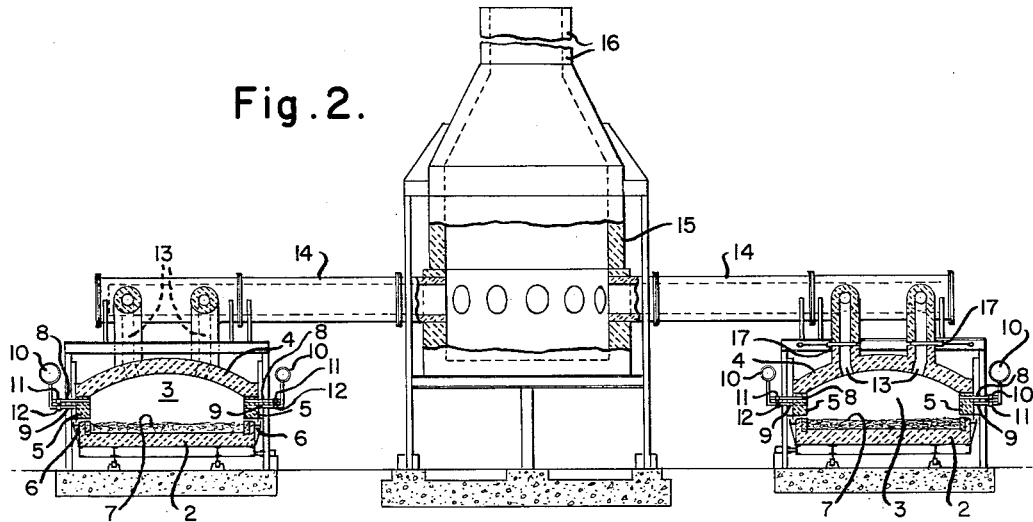

Jan. 4, 1966

R. J. ASQUINI 3,227,627

PROCESS AND APPARATUS FOR HEAT TREATMENT OF MATERIAL WHICH
YIELDS OXIDIZABLE VOLATILE MATTER UNDER HEAT

Filed Oct. 15, 1962

INVENTOR
Robert J. Asquini
his attorneys

United States Patent Office 3,227,627
Patented Jan. 4, 1966

3,227,627
PROCESS AND APPARATUS FOR HEAT TREATMENT OF MATERIAL WHICH YIELDS OXIDIZABLE VOLATILE MATTER UNDER HEAT
Robert J. Asquini, Whitehall Borough, Pa.; Helen Jean Moore, administratrix of said Asquini, deceased, assignor to Salem Brosius Company, Pittsburgh, Pa., a corporation of Pennsylvania
Filed Oct. 15, 1962, Ser. No. 230,424
16 Claims. (Cl. 201—27)

This invention relates to a process and apparatus for the continuous low cost heat treatment of material which yields oxidizable volatile matter under heat to remove such volatile matter from the material and continuously produce residuum which remains after removal of the volatile matter, the removal of volatile matter being effected largely by heat derived by oxidation in a devolatilizing chamber of volatile matter yielded by the material being treated. My process may be denominated by those skilled in the art coking, calcining, degassing or devolatilizing, depending on the nature of the material being treated and of the volatile matter yielded by such material. However, for purposes of this application I shall employ the term "devolatilizing" to comprehend all such processes. Example materials which can be treated by my process are coal (coking or non-coking), coke, pitch, tar, asphalt, lignite, gilsonite, petroleum coke and other residua from the refining of petroleum, either in their natural state or, singly or in combination, in the form of briquettes.

Since the development and general industrial acceptance of the so-called slot oven or by-product coke oven most further developments in devolatilizing have been designed to attempt salvage of the gases and other by-products of the material being devolatilized. The desire to recover such by-products has caused previous investigators to approach the problem with the idea in mind that the devolatilizing had to be carried out with the material being treated being kept out of contact with air whereby to avoid oxidation of the material. This approach has led to the design of elaborate, costly and complicated systems which have employed a variety of methods of and apparatus for heat treating materials while keeping the materials out of contact with air. Such apparatus has included closed pots, containers or cars moved through a heating chamber. Various proposals have been made for heat application by ducts, flues and auxiliary chambers above, below or to the side of the chamber containing the material being treated, combined with heat exchangers, auxiliary furnaces, auxiliary burners, etc. All of these prior schemes were forced to rely upon some sort of mechanical separating medium to keep the material being treated out of contact with air.

I take an entirely new tack. I devolatilize the material being treated by direct application of heat to the material, preferably or largely through radiation from the roof and side walls of the devolatilizing chamber, such heat being continuously supplied by oxidation within the chamber of the oxidizable volatile matter being continuously driven off from the material being treated.

I provide a continuous process for removing by heat oxidizable volatile matter from material which yields such volatile matter under heat comprising continuously delivering such material onto a continuously moving hearth, continuously delivering residuum from the continuously moving hearth, during the time during which the material lies upon the continuously moving hearth confining the material in a devolatilizing chamber and during movement of the material through such chamber devolatilizing the material by heat derived by oxidation of the volatile matter within the chamber.

The devolatilizing chamber has a roof and side walls, and during movement of the material through such chamber the available volatile matter within the chamber is oxidized, the roof and side walls of the chamber are heated by the heat created by the oxidation of the volatile matter and the material in the chamber is devolatilized largely by heat radiated from the roof and side walls of the chamber. I heat the continously moving hearth and the roof and side walls of the chamber by the heat created by the oxidation of the volatile matter and devolatilize the material in the chamber largely by direct heating from the continuously moving hearth and heat radiated from the roof and side walls of the chamber. The heat created by the oxidation of the volatile matter is sufficient to make the process autogenetic. The oxidation creates luminous flame and the devolatilizing of the material in the chamber is contributed to by heat of such luminous flame.

I support the oxidation of the volatile matter within the devolatilizing chamber by introducing oxygen (normally in the form of air) into the devolatilizing chamber at a level above the top of the material on the hearth, the oxygen oxidizing the volatile matter and providing an oxidizing atmosphere in the upper portion of the devolatilizing chamber while effectively maintaining a reducing atmosphere around the material being treated.

I preferably exhaust gases and admit oxygen selectively at zones along the devolatilizing chamber and control the admission of oxygen and the exhausting of gases at the respective zones to in turn control the oxidation in the chamber to oxidize in a predetermined zone volatile matter released in a different zone. I control the oxidation and hence the temperature at the respective zones along the devolatilizing chamber enabling production from the same charge material of residuum of differing chemical and physical properties.

I may introduce volatile matter into the devolatilizing chamber from without and devolatilize the material in the chamber by heat derived by oxidation in the chamber of volatile matter released by the material being treated combined with volatile matter introduced into the chamber from without. This may be done when the material being treated does not release sufficient oxidizable volatile matter to create a sufficient amount of heat to effectively carry out the process. Oxygen is introduced into the devolatilizing chamber in such quantity as required to support oxidation of substantially all volatile matter in the chamber from whatever source derived. The additional heat supplied by oxidation of volatile matter introduced from without speeds up the process. The heat derived by oxidation of the volatile matter within the devolatilizing chamber may be supplemented by heat from burners directed into the chamber.

I also provide continuous heat treating apparatus comprising a hearth of refractory material, means forming a tunnel-like devolatilizing chamber in which the hearth is disposed, means for continuously advancing the hearth in the chamber, means for continuously delivering onto the advancing hearth material which yields oxidizable volatile matter under heat, means for introducing oxygen to oxidize the volatile matter and means for continuously delivering residuum from the continuously moving hearth. The hearth is preferably an annular hearth which is continuously rotated in a tunnel-like devolatilizing chamber. The hearth may be in other forms, for example, in the form of an endless element operating about two spaced apart horizontal shafts with the upper reach forming the hearth, but the annular rotary hearth has an advantage in that the hearth has a much shorter time to cool off between the time when residuum is removed therefrom and the time when material to be treated is delivered to the same portion of the hearth.

I provide means for introducing oxygen to oxidize the volatile matter in the upper portion of the devolatilizing chamber to heat the roof and side walls of the devolatilizing chamber so that the roof and side walls radiate heat onto the material on the hearth. Preferably the distance between the hearth and the roof is of the order of the thickness of the bed of the material being treated plus sufficient vertical space to permit volatilization of the material being treated plus an additional increment so that the volatile matter is oxidized in the upper portion of the chamber to heat the roof and side walls to radiate heat directly onto the material on the hearth to volatilize such material.

The means for introducing oxygen are preferably disposed at a level above the top of the bed of material on the hearth to oxidize the volatile matter in the upper portion of the chamber while effectively maintaining a reducing atmosphere about such material.

I preferably provide means for selectively introducing oxygen to oxidize the volatile matter and exhausting gases from the chamber at zones along the chamber. I may also provide means for introducing volatile matter in addition to that yielded by the material being treated together with oxygen to oxidize the volatile matter yielded by the material being treated and also the additional volatile matter.

My preferred apparatus is a continuous rotary oven employing a solid annular refractory hearth which rotates continuously and carries a bed of material through a circular path in an annular devolatilizing chamber which preferably has refractory side walls and a refractory roof. The entrance and exit ports of the annular oven may be equipped with vertically adjustable baffles which may be raised or lowered to control the amount of air which is allowed to enter the oven at either port. As these baffles are raised to be desired height above the hearth they provide a passage into and out of the oven chamber for the material being treated. Their height can be so arranged as to create dams of material going into and coming out of the chamber, thereby providing for the proper continuous feed and discharge of material and also for control of air admission at either end of the path of movement of the material through the chamber.

When my oven is to be put into operation it is first fed with high volatile matter such as coal which may be sprayed with oil to give oven more volatility. Gas may be employed to assist in bringing the oven up to efficient operating temperature. The material on the hearth may be stoked by hand through openings in the roof and the hearth may be operated at whatever speed is required to keep the five on the hearth burning freely while the temperature in the oven is building up. After a warming or preheating period of perhaps one to three days the hearth, side walls and roof of the oven will have absorbed sufficient heat to permit autogenetic operation of my process.

Other details, objects and advantages of the invention will become apparent as the following description of a present preferred embodiment thereof and a present preferred method of practicing the same proceeds.

Figure 1:
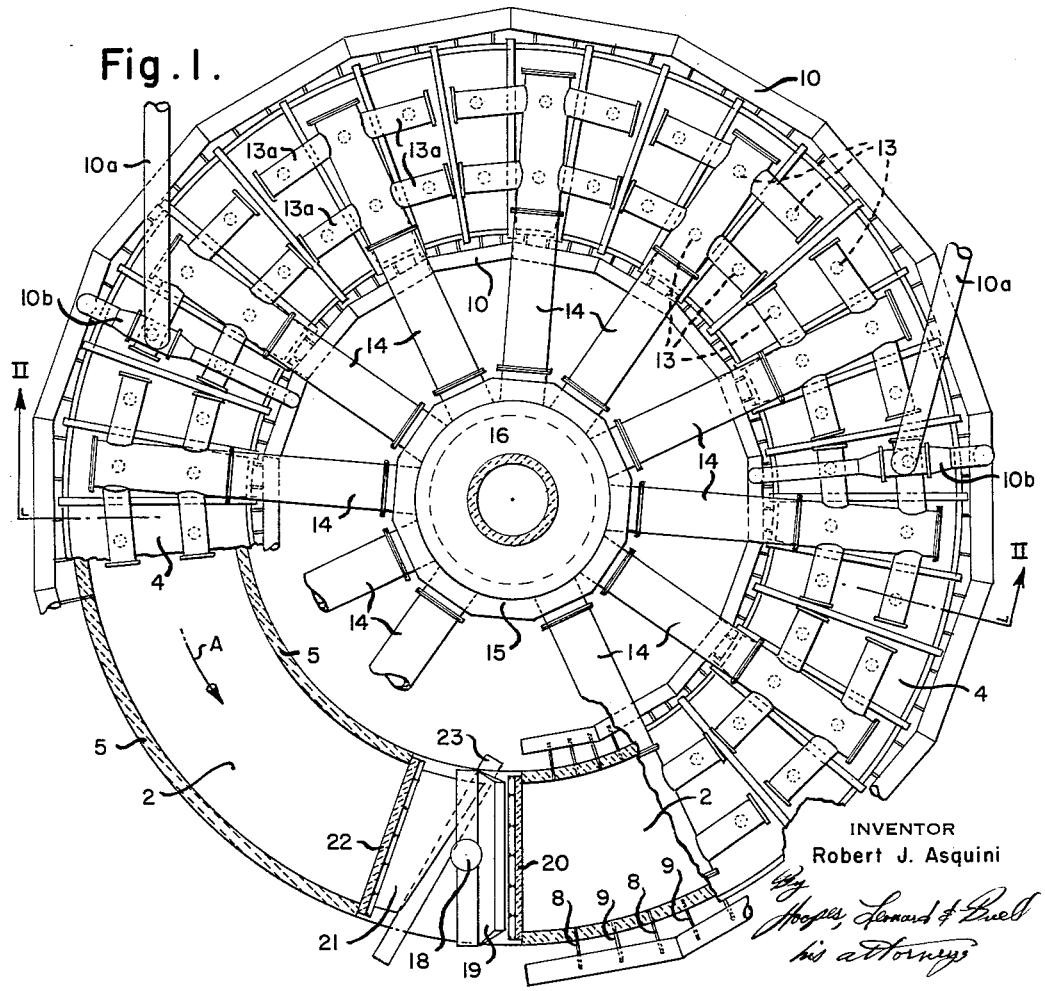

In the accompanying drawings I have shown a present preferred embodiment of the invention and have illustrated a present preferred method of practicing the same in which FIGURE 1 is a plan view of a rotary hearth coke oven with portions cut away showing parts in horizontal cross sections; and FIGURE 2 is a central vertical cross-sectional view taken on the line II—II of FIGURE 1.

Referring now more particularly to the drawings, the coke oven shown therein and which has been selected for the purpose of exemplifying my apparatus comprises an annular hearth 2 of the general type of the annular hearths disclosed in copending applications Serial Nos. 64,776, filed October 25, 1960, and 173,036, filed February 13, 1962 both now abandoned. The annular hearth 2 throughout most of its 360° forms part of a tunnel-like coking chamber 3 which is the exemplification of my devolatilizing chamber. The oven has a roof 4 over the annular hearth 2 and has side walls 5 so that the coking or devolatilizing chamber 3 is a closed chamber formed by the hearth 2, the roof 4 and the side walls 5. The hearth rotates in the direction indicated by the arrow A in FIGURE 1 while the roof and side walls are stationary. Seals 6 are provided at both sides of the hearth to prevent leakage between the hearth and the side walls.

The means for driving the hearth form no part of the present invention. Such means may be conventional and are adapted to drive the hearth at selected speeds.

FIGURE 2 shows a bed of coal 7 being coked upon the hearth 2. The oven is preferably proportioned so that the distance between the hearth 2 and the roof 4 is of the order of the thickness of the bed of material being treated plus sufficient vertical space to permit volatilization of the material being treated plus an additional increment so that the volatile matter is oxidized in the upper portion of the chamber to heat the roof and side walls to radiate heat directly onto the material on the hearth to volatilize such material. For example, the distance between the hearth 2 and the roof 4 may be three feet, three inches, while the thickness of the bed of coal on the hearth may be twelve inches. This provides a vertical space between the top of the bed of coal on the hearth and the roof of two feet, three inches, which permits volatilization of the coal on the hearth yet maintains the roof close enough to the hearth that a very effective amount of heat is radiated from the roof to the bed of coal on the hearth. The hearth is heated by the heat of oxidation of the volatile matter given off by the bed of coal on the hearth so that the bed of coal on the hearth derives heat directly from the hearth and by radiation from the roof and side walls and further from the heat of the luminous flame created by oxidation of the oxidizable volatile matter given off by the coal on the hearth.

I proved means at zones along the hearth for introducing oxygen in the form of air and for exhausting gases from the devolatilizing chamber so that the quantity of air introduced and the quantity of gases exhausted from the devolatilizing chamber at any zone may be controlled as desired. The air is introduced at a level above the top of the bed of coal on the hearth to oxidize the volatile matter in the upper portion of the chamber to heat the roof and side walls so that they radiate heat onto the material on the hearth to volatilize such material while effectively maintaining a reducing atmosphere about such material. At each zone about the oven I provide two sets of wickets at each of the inner and outer peripheries of the chamber 3 extending through the inner and outer side walls 5 respectively, an upper set 8 and a lower set 9 which are connected as shown with inner and outer peripheral bustle pipes 10 for delivering air under pressure, the air being transmitted to the bustle pipes 10 through supply pipes 10a and headers 10b. Valves 11 and 12 are provided so that the quantity of air introduced through each wicket may be controlled. When a relatively thin bed of material is disposed on the hearth 2 the lower wickets may be employed while when a relatively thick bed of material is disposed on the hearth the upper wickets may be employed. Exhaust ports 13 are provided in the roof 4 which communicate through radially arranged ducts 14 having branches 13a with a centrally located after-burner designated generally by reference numeral 15 which may be surmounted by a stack 16, the after-burner being disclosed in copending applications Serial Nos. 170,752 and 170,753, filed February 2, 1962. The exhaust ports 13 are controlled by slide valves 17 so that a desired quantity of gases may be exhausted at any point along the hearth. By suitable control of the valves 11, 12 and 17 it is possible to control conditions at all zones along the hearth so that at a particular zone oxidation and volatilization may be retarded while in another zone oxidation and volatilization may be speeded. This makes possible control of temperatures in the devolatilizing chamber and maintenance of the material being treated at a desired temperature for a desired time. In this way the character of the volatile matter released as well as the character of the residuum remaining on the hearth may be widely varied. Volatile matter released in one zone may be oxidized in a preselected different zone and products of differing chemical and physical properties may be produced from the same charge material.

The coal or other material to be treated is fed by conveyor into the hopper 18. It travels by gravity into chute 19 which delivers the material onto the hearth 2, an adjustable baffle 20 providing for loading of the hearth with any desired thickness of material as it continuously rotates. As the material leaves chute 19 and comes to rest on hearth 2 it immediately begins heating as the hearth 2 has absorbed considerable heat in its travel through the oven and in a typical coking cycle will have a surface temperature where the coal is delivered to it of up to 1200° F. As the coal is affected by the heat of the hearth it almost immediately begins to devolatilize on the bottom of the bed and enters the devolatilizing chamber with the coking or devolatilizing process already under way. The baffle 20 is kept at such a level that new material will build up against it whereby a further leveling and thickness control is exercised. As the material passes under the baffle 20 and into the devolatilizing chamber it encounters radiant heat from the roof 4 and also from the side walls 5 and further release of volatile matter occurs. As some coals or other materials give off their volatiles more readily than others and as the speed of coking or devolatilizing of some materials should be faster or slower than that of others it is at this period that ventilation control, i.e., control of the valves 11, 12 and 17, is first effected within the devolatilizing chamber.

As soon as the material has passed under the baffle 20 it is within the coking or devolatilizing chamber and in a temperature environment of 500° F. to 2000° F. depending upon the speed of heating desired. If a slow temperature rise is desired the exhaust ports 13 in the roof 4 will be closed and the valves 11 and 12 will likewise be closed, causing the first zone of the devolatilizing chamber beyond the baffle 20 to act merely as a warming zone with some volatiliziation but little oxidation or combustion occurring. The length of that zone, i.e., the length of time during which the material advancing on the bed is merely warmed with little combustion or oxidation, may be determined by control of the valves 11, 12, and 17. If rapid temperature rise is desired the valves 17 will be opened and the valves 11 or 12 will likewise be at least partially opened, causing volatilization to occur at a more rapid rate accompanied by combustion of the volatile gases in the upper portion of the devolatilizing chamber. The temperature will be higher and the entire process will proceed at a faster rate.

As the volatile matter is being given off from the material on the hearth it rises through and above the bed of material. Simultaneously and continuously air is carefully controlled amounts is being admitted into the devolatilizing chamber through wickets 8 or 9 at a level above the level of the top of the bed 7. The hot volatile matter combines with the oxygen in the air above bed 7 and oxidation or combustion takes place in the upper portion of the chamber. The heat of such combustion is transmitted to the bed 7 and causes continuation of the release of volatile matter. The rate at which the process proceeds is controlled, as above indicated, by varying the openings of the valves 11, 12 and 17 and varying the speed of rotation of the hearth and the depth of the bed 7. The heat is transmited to the bed 7 through conduction and radiation from the inner surfaces of the devolatilizing chamber and through direct radiation from the luminous flame resulting from the combustion of the volatile matter.

The rising currents of volatile matter combined with the fact that the wickets 8 and 9 are at a level above the level of the top of the bed 7 of material on the hearth 2 create a draft causing passage of the gases and products of combustion out through the exhaust ports 13 and result in maintenance of reducing atmosphere around the bed 7 while the atmosphere in the upper portion of the devolatilizing chamber is oxidizing in character.

As above indicated, the speed of devolatilization may be varied. The volatile matter given off by coal, petroleum coke and other materials if burned in an oven as it is being driven off from its source material in union with the amount of air required to effect complete combustion will usually generate temperatures not in excess of 2200° F. to 2300° F. In my process, because it is continuous and because all phases of the process are being carried out simultaneously in one devolatilizing chamber, I can move volatile matter before it is burned from one zone to another and thereby create an unnatural amount of heat through extra combustion at any desired stage of the process. It is a well known fact that coking speed rises faster proportionally than temperature. I can concentrate volatile matter in, for example, the first 40% of the furnace chamber and by introducing there the amount of air required to effect combustion of such volatile matter I can produce temperatures up to 2700° F. This movement of unburned volatiles in the devolatilizing chamber from one zone to another allows speeding up or retarding devolatilization in any zone as desired. It is accomplished by closing of the exhaust ports in a zone, thereby forcing the volatile matter from that zone to the zone where its combustion is desired. This may be further assisted by opening the exhaust ports in the zone to which the volatile matter is to be transferred. Extra draft to accomplish this induced movement of volatiles may be brought about by the addition of draft producing means such as stack 16. The products of combustion may be transferred from zone to zone in a similar manner for additional heat control.

By properly combining the variables mentioned I have been able by use of my process to reach and maintain a coking rate from one side only of over 1.8 inches per hour. This much faster than normal rate of coking increases tremendously the output of finished product per square foot of hearth surface and materially reduces the per ton cost of coking with great and important financial benefit to users of the process.

The variables of air intake, gas exhaust, bed depth and speed of rotation can be infinitely combined to produce a suitable condition for the efficient coking, calcining, degassing or devolatilizing of practically any material containing oxidizable or combustible volatile matter. Excellent quality chemical cokes, char and briquettes have been made or treated. If the material being treated does not contain sufficient volatile matter to satisfactorily support the combustion required to effect its own devolatilization extra volatile matter, for example in the form of oil, may be added to the material being treated as it is fed onto the hearth, or extra gas may be introduced through vents in the side walls 5 to supply the desired volatile content in the zone where it is required. This unique method of supplying extra volatile matter for oxidation in the same devolatilizing chamber that contains the material being treated brings about maximum benefit from the heat generated by the total of all volatile matter oxidized and provides an efficient method of treating materials with minimum fuel consumption.

The variables of air intake, gas exhaust, bed depth and speed of rotation can be controlled so as to heat coal, for example, in a thin bed which may have a thickness of two inches at speeds of temperature rise so rapid that the coal swells and boils due to the extremely rapid rate of heating with the result that the coal passes the fluid stage long before all its volatile matter has been released and while it is in a very puffy, swollen and porous state. The high temperature to which it is subjected while in that condition causes it to freeze in the porous state; thus a sponge-like coke is produced at an extremely high coking rate. The sponge-like coke has thin cell wall construction and high porosity. Its air space content is so high that no quenching of any sort is required and it may be discharged from the oven at a temperature of the order of 2000° F. and picked up immediately in the bare hand. This extremely rare quality makes the sponge-like coke a likely source of sinter fuel for the steel industry and other sinter applications since it can be crushed to small size with little effort, with little generation of dust or minus 100-mesh material and can be prepared as an essentially moisture-free product.

After the oven has been placed in continuous operation, as the coal or other material enters the coking chamber the temperatures and the rate of devolatilization are controlled as above explained by manipulation of the valves 11, 12 and 17. The control is first effected in the first zone beyond the baffle 20 and as the process continues and the material moves on around the devolatilizing chamber the various exhaust ports and wickets are adjusted to produce the temperatures and heat effects desired at the various stages looking toward the production of a certain finished product. The conditions will of course vary according to the characteristics of the material being treated and also according to the desired characteristics of the material to be produced. Thus my process can produce coke of varied specific gravity and of varied volatile content and with varied stability factors from the same charge material. As the material being treated nears the end of its passage through the annular chamber it is followed by a continuous bed of material stretching back to the baffle 20. The resistance or pushing force of such continuous bed of material on the rotating hearth provides the required force to push the residuum up the slope of the discharge plow 21 under discharge baffle 22, which is similar in structure and function to the baffle 20. The treated material or residuum is removed from the discharge plow by a conveyor diagrammatically illustrated at 23 which may be of any suitable construction.

While I have shown and described a present preferred embodiment of the invention and have illustrated a present preferred method of practicing the same it is to be distinctly understood that the invention is not limited thereto but may be otherwise variously embodied and practiced within the scope of the following claims.

I claim:

1. A continuous process for removing oxidizable volatile matter from material which yields such volatile matter under heat by burning all of said removed volatiles within a substantially airtight devolatilizing chamber, comprising continuously delivering such material onto a continuously moving imperforate hearth, continuously removing residuum from the continuously moving hearth, during the time during which the material lies upon the continuously moving hearth confining the material in a devolatilizing chamber having a roof and side walls and during movement of the material through such chamber introducing oxygen in controlled quantities above the material on the hearth at spaced points along the hearth and oxidizing the volatile matter within the chamber, heating the roof and side walls of the chamber by the heat created by the oxidation of the volatile matter and devolatilizing the material in chamber largely by heat radiated from the roof and side walls of the chamber.

2. A continuous process for removing oxidizable volatile matter from material which yields such volatile matter under heat by burning all of the said removed volatiles within a substantially airtight devolatilizing chamber, comprising continuously delivering such material onto a continuously moving imperforate hearth, continuously delivering residuum from the continuously moving hearth, during the time during which the material lies upon the continuously moving hearth confining the material in a devolatilizing chamber having a roof and side walls and during movement of the material through such chamber introducing oxygen in controlled quantities above the material on the hearth at spaced points along the hearth and oxidizing the volatile matter within the chamber, heating the roof and side walls of the chamber by the heat created by the oxidation of the volatile matter and devolatilizing the material in the chamber largely by heat radiated from the roof and side walls of the chamber, the heat created by the oxidation of the volatile matter being sufficient to make the process autogenetic.

3. A continuous process for removing oxidizable volatile matter from material which yields such volatile matter under heat by burning all of said removed volatiles within a substantially airtight devolatilizing chamber, comprising continuously delivering such material onto a continuously moving imperforate hearth, continuously delivering residuum from the continuously moving hearth, during the time during which the material lies upon the continuously moving hearth confining the material in a devolatilizing chamber and during movement of the material through such chamber devolatilizing the material by heat derived by oxidation of the volatile matter within the chamber and supporting the oxidation by introducing oxygen into the chamber containing the material solely at a level above the top of the material on the hearth and at spaced points along the hearth, such oxygen oxidizing the volatile matter and providing an oxidizing atmosphere in the upper portion of the chamber while effectively maintaining a reducing atmosphere around the material being treated.

4. A continuous process for removing oxidizable volatile matter from material which yields such volatile matter under heat and obtaining such heat by completely burning off substantially all of the said removed volatile matter, comprising continuously delivering such material onto a continuously moving imperforate hearth, continuously delivering residuum from the continuously moving hearth, during the time during which the material lies upon the continuously moving hearth confining the material in a devolatilizing chamber and during movement of the material through such chamber devolatilizing the material by heat derived by oxidation of the volatile matter within the chamber, admitting oxygen and exhausting gases selectively at zones along the chamber solely above the material on the hearth and controlling the admission of oxygen and the exhausting of gases at the respective zones to in turn control the oxidation in the chamber to oxidize in a predetermined zone volatile matter released in a different zone.

5. A continuous process for removing oxidizable volatile matter from material which yields such volatile matter under heat and obtaining such heat by completely burning off all of the said removed volatile matter comprising continuously delivering such material onto a continuously moving imperforate hearth, continuously delivering residuum from the continuously moving hearth, during the time during which the material lies upon the continuously moving hearth confining the material in a devolatilizing chamber and during movement of the material through such chamber introducing oxygen in controlled quantities above the material on the hearth at spaced points along the hearth and devolatilizing the material by heat derived by oxidation of the volatile matter within the chamber and controlling the oxidation and hence the temperature at zones along the chamber enabling production from the same charge material of residuum of differing chemical and physical properties.

6. A continuous process for removing oxidizable volatile matter from material which yields such volatile matter under heat and obtaining such heat by completely burning off all of the said removed volatile matter comprising continuously delivering such material onto a continuously moving imperforate hearth, continuously delivering residuum from the continuously moving hearth, during the time during which the material lies upon the continuously moving hearth confining the material in a devolatilizing chamber and during movement of the material through such chamber introducing oxygen in controlled quantities above the material on the hearth at spaced points along the hearth and introducing volatile matter into the chamber from without the devolatilizing material in the chamber by heat derived by oxidation in the chamber of volatile matter released by the material being treated combined with volatile matter introduced into the chamber from without.

7. A continuous process for removing oxidizable volatile matter from material which yields such volatile matter under heat such heat being obtained by burning off substantially all of the said removed volatile matter, comprising continuously delivering such material onto a continuously moving imperforate hearth, continuously delivering residuum from the continuously moving hearth, during the time during which the material lies upon the continuously moving hearth confining the material in a devolatilizing chamber and during movement of the material through such chamber introducing oxygen in controlled quantities above the material on the hearth at spaced points along the hearth and introducing volatile matter and oxygen into the chamber from without and devolatilizing the material in the chamber by heat derived by oxidation in the chamber of volatile matter released by the material being treated combined with volatile matter introduced into the chamber from without, the oxygen being introduced in sufficient quantity to support oxidation of such combined volatile matter, the additional heat supplied by oxidation of the volatile matter introduced from without speeding up the process.

8. A continuous process for removing oxidizable volatile matter from material which yields such volatile matter under heat and obtaining such heat by burning off all of the said removed volatile matter, comprising continuously delivering such material onto a continuously moving imperforate hearth, continuously delivering residuum from the continuously moving hearth, during the time during which the material lies upon the continuously moving hearth confining the material in a devolatilizing chamber and during movement of the material through such chamber introducing oxygen in controlled quantities above the material on the hearth at spaced points along the hearth and devolatilizing the material by heat derived by oxidation of the volatile matter within the chamber supplemented by heat from burners directed into the chamber.

9. Continuous heat treating apparatus comprising an imperforate hearth of refractory material, means forming a tunnel-like devolatilizing chamber in which the hearth is disposed, means for continuously advancing the hearth in the chamber, means for continuously delivering onto the advancing hearth material which yields oxidizable volatile matter under heat, means for introducing oxygen solely above the hearth at spaced points along the hearth to oxidize the volatile matter means for exhausting gases at spaced zones about the hearth solely above the material on the hearth and means for continuously delivering residuum from the continuously moving hearth.

10. Continuous heat treating apparatus comprising an imperforate annular hearth of refractory material, means forming a tunnel-like devolatilizing chamber in which the annular hearth is disposed, means for continuously rotating the annular hearth in the chamber, means for continuously delivering onto the continuously rotating annular hearth material which yields oxidizable volatile matter under heat, means for continuously introducing oxygen solely above the hearth at spaced points along the hearth to oxidize the volatile matter means for exhausting gases at spaced zones about the hearth solely above the material on the hearth and means for continuously delivering residuum from the continuously rotating hearth.

11. Continuous heat treating apparatus comprising an imperforate hearth of refractory material, means forming a tunnel-like devolatilizing chamber in which the hearth is disposed, the chamber having a roof over the hearth and having side walls, means for continuously advancing the hearth in the chamber, means for continuously delivering onto the advancing hearth material which yields oxidizable volatile matter under heat, means for introducing oxygen solely above the hearth at spaced points along the hearth to oxidize the volatile matter in the upper portion of the chamber to heat the roof and side walls so that the roof and side walls radiate heat onto the material on the hearth to volatilize such material means for exhausting gases at spaced zones about the hearth solely above the material on the hearth and means for continuously delivering residuum from the continuously moving hearth.

12. Continuous heat treating apparatus comprising an imperforate hearth of refractory material, means forming a tunnel-like devolatilizing chamber in which the hearth is disposed, the chamber having a roof over the hearth and having side walls, means for continuously advancing the hearth in the chamber, means for continuously delivering onto the advancing hearth material which yields oxidizable volatile matter under heat, which material lies in a bed on the hearth, means for introducing oxygen and at spaced points along the hearth at a level above the top of the hearth to oxidize the volatile matter in the upper portion of the chamber while effectively maintaining a reducing atmosphere about such material means for exhausting gases at spaced zones about the hearth solely above the material on the hearth and means for continuously delivering residuum from the continuously moving hearth.

13. Continuous heat treating apparatus comprising an imperforate hearth of refractory material, means forming a tunnel-like devolatilizing chamber in which the hearth is disposed, means for continuously advancing the hearth in the chamber, means for continuously delivering onto the advancing hearth material which yields oxidizable volatile matter under heat, means for selectively introducing oxygen solely above the hearth at spaced points along the hearth to oxidize the volatile matter and exhausting gases from the chamber at zones along the chamber and means for continuously delivering residuum from the continuously moving hearth.

14. Continuous heat treating apparatus comprising an imperforate hearth of refractory material, means forming a tunnel-like devolatilizing chamber in which the hearth is disposed, means for continuously advancing the hearth in the chamber, means for continuously delivering onto the advancing hearth material which yields oxidizable volatile matter under heat, means for introducing into the chamber additional volatile matter, means for introducing oxygen solely above the hearth at spaced points along the hearth to oxidize the volatile matter yielded by the material being treated and also the additional volatile matter, means for exhausting gases at spaced zones about the hearth solely above the material on the hearth and means for continuously delivering residuum from the continuously moving hearth.

15. Continuous heat treating apparatus comprising an imperforate hearth of refractory material, means forming a tunnel-like devolatilizing chamber in which the hearth is disposed, the chamber having a roof over the hearth and having side walls, means for continuously advancing the hearth in the chamber, means for continuously delivering onto the advancing hearth material which yields oxidizable volatile matter under heat, which material lies in a bed on the hearth, means for introducing into the chamber additional volatile matter, means for introducing oxygen at spaced points along the hearth at a level above the top of the hearth to oxidize the volatile matter yielded by the material being treated and also the additional volatile matter in the upper portion of the chamber to heat the roof and side walls so that the roof and side walls radiate heat onto the material on the hearth to volatilize such material while effectively maintaining a reducing atmosphere about such material means for exhausting gases at spaced zones about the hearth solely above the material on the hearth and means for continuously delivering residuum from the continuously moving hearth.

16. A continuous process for removing oxidizable volatile matter from material which yields such volatile matter by burning off substantially all of said volatiles within a substantially airtight devolatilizing chamber and recovering a substantially devolatilized residuum comprising continuously delivering such material to the inlet end of a continuously moving imperforate hearth, continuously removing residuum from the continuously moving hearth at the outlet end thereof, confining the material in said devolatilizing chamber during movement of the material through said chamber, introducing oxygen in controlled quantities at a point above the material on said hearth and at spaced locations along said hearth, exhausting gases at spaced zones about the hearth solely above the material on the hearth and controlling such introduction of oxygen and exhaust of gases at the various zones to control the temperatures therein and to determine the character of the residuum recovered from the outlet end of the hearth.

References Cited by the Examiner

UNITED STATES PATENTS

| | | | |
|---|---|---|---|
| 1,334,405 | 3/1920 | Rodman | 202—6 |
| 1,429,578 | 9/1922 | Galusha | 202—91 |
| 1,814,463 | 7/1931 | Trent | 202—19 |
| 1,906,755 | 5/1933 | Karrick | 202—19 |
| 2,955,991 | 10/1960 | Tufty | 202—27 |
| 2,997,426 | 8/1961 | Mansfield | 202—27 |

FOREIGN PATENTS 129,771    7/1919    Great Britain.

MORRIS O. WOLK, *Primary Examiner.*